(12) United States Patent
Yoneda et al.

(10) Patent No.: US 7,103,738 B2
(45) Date of Patent: Sep. 5, 2006

(54) SEMICONDUCTOR INTEGRATED CIRCUIT HAVING IMPROVING PROGRAM RECOVERY CAPABILITIES

(75) Inventors: Takashi Yoneda, Osaka (JP); Tsutomu Kamiyoshi, Nara (JP); Hiroshi Benno, Osaka (JP); Shirou Yoshioka, Hyogo (JP); Tsuneo Uenishi, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 496 days.

(21) Appl. No.: 10/647,260

(22) Filed: Aug. 26, 2003

(65) Prior Publication Data

US 2004/0037156 A1 Feb. 26, 2004

(30) Foreign Application Priority Data

Aug. 26, 2002 (JP) ............................. 2002-245218

(51) Int. Cl.
*G06F 12/16* (2006.01)
*G06F 12/11* (2006.01)

(52) U.S. Cl. ............................ 711/162; 714/51; 714/55

(58) Field of Classification Search ................. 711/162; 714/51, 55
See application file for complete search history.

(56) References Cited

FOREIGN PATENT DOCUMENTS

JP 6-131218 5/1994

*Primary Examiner*—Jack A. Lane
(74) *Attorney, Agent, or Firm*—McDermott Will & Emery LLP

(57) ABSTRACT

A backup memory, a DMA (direct memory access) controller, and a WDT (watch dog timer) are provided in addition to a CPU (central processing unit), a RAM (random access memory), and a peripheral circuit. The DMA controller exercises control so that respective data of the CPU, RAM and peripheral circuit is saved in the backup memory each time the CPU, being under normal operation, supplies a counter reset signal to the WDT, and so that the data that has been saved in the backup memory is restored to the CPU, the RAM and the peripheral circuit, respectively, if the WDT has detected a program runaway and outputted a time-over signal. Therefore, even in a case where a program runaway has occurred in the CPU, normal operation is permitted to be resumed from midway in the program.

11 Claims, 3 Drawing Sheets

SEMICONDUCTOR INTEGRATED CIRCUIT HAVING IMPROVING PROGRAM RECOVERY CAPABILITIES

BACKGROUND OF THE INVENTION

The present invention relates to a semiconductor integrated circuit including a control block, for example, a processor, of a stored-program type.

Japanese Laid-Open Publication No. 6-131218 discloses a technique which utilizes a watch dog timer (WDT) as one of the processor (CPU) control techniques in which an abnormal condition in a computer system is detected to reset the CPU. The WDT, which monitors a counter reset signal outputted regularly from the CPU, outputs a time-over signal if the counter reset signal has not been inputted within a given period of time because of a program runaway. The time-over signal outputted from the WDT resets the CPU for recovery to the normal state.

However, a problem with the conventional technique has been that because the CPU is reset to the initial state by the time-over signal, the program is re-executed from the beginning, as a result of which the data is destroyed midway.

SUMMARY OF THE INVENTION

It is therefore an object of the present invention to allow normal operation to be resumed from midway in a program even in a case where the program has run away.

To achieve the object, an inventive semiconductor integrated circuit includes: a control block of a stored-program type; a backup memory in which saved data is stored; runaway detection means for detecting a program runaway in the control block; and data transfer control means for exercising control so that data of the control block is saved in the backup memory when the control block operates normally, and so that the data that has been saved in the backup memory is restored to the control block, if the program runaway has been detected.

When the semiconductor integrated circuit further includes another circuit block including a data storage portion, the data transfer control means further functions to exercise control so that data of said another circuit block is saved in the backup memory when the control block operates normally, and so that the data that has been saved in the backup memory is restored to said another circuit block, if the program runaway has been detected.

DESCRIPTION OF THE PREFERRED EMBODIMENTS

Hereinafter, embodiments of the present invention will be described with reference to the accompanying drawings.

Figure 1:
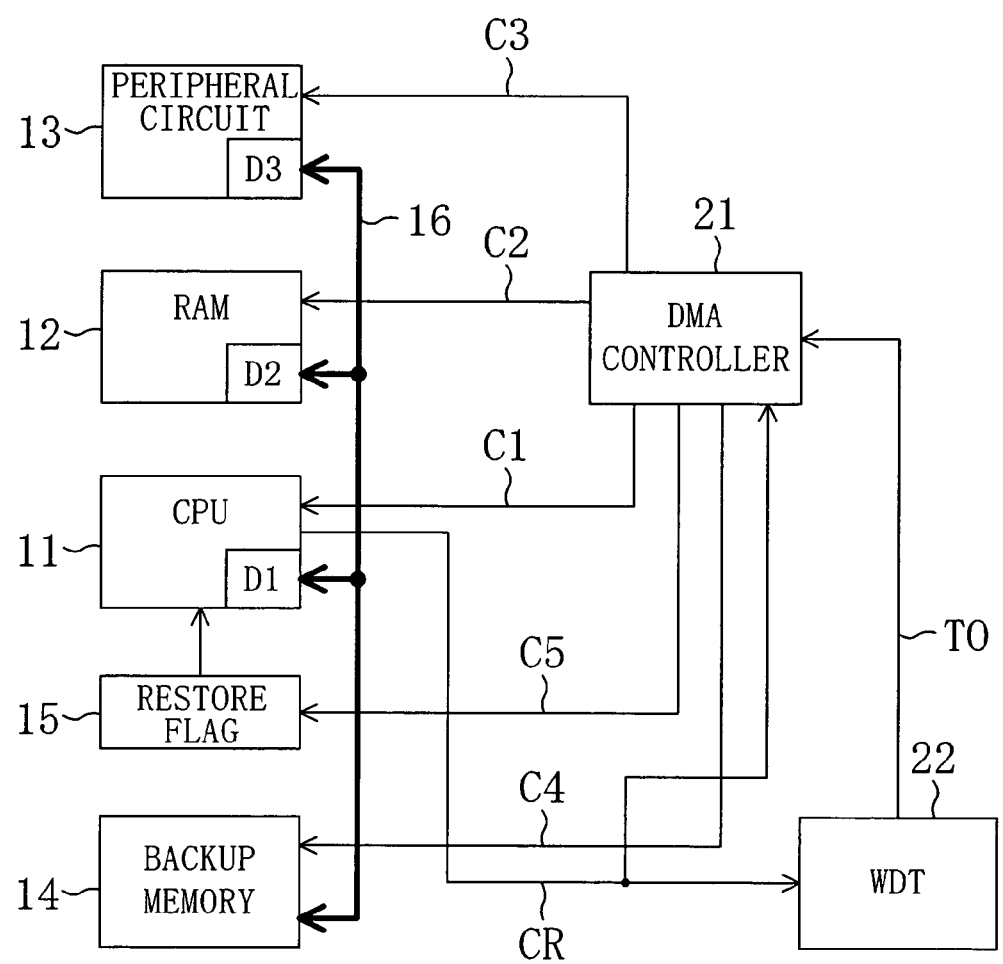
FIG. 1 is a block diagram illustrating an exemplary configuration of a semiconductor integrated circuit in accordance with the present invention.

FIG. 1 illustrates an exemplary configuration of a semiconductor integrated circuit in accordance with the present invention. In FIG. 1, the reference numeral 11 denotes a CPU, 12 denotes a RAM, 13 denotes a peripheral circuit, and 14 denotes a backup memory. The CPU 11 is a control block of a stored-program type, which operates in accordance with a program stored in a not-shown ROM. The RAM 12 is a memory for storing data necessary for the operation of the CPU 11. The peripheral circuit 13 is an input/output portion having various functions such as serial communications and analog-to-digital conversion. The backup memory 14 is a memory in which data D1, D2 and D3 are saved. The data D1 is the important data held by a program counter, as well as various registers including a status register, of the CPU 11. The data D2 is the critical data among all the data stored in the RAM 12. The data D3 is the crucial data among all the data held by the various kinds of input/output control registers of the peripheral circuit 13. The CPU 11, the RAM 12, the peripheral circuit 13 and the backup memory 14 are connected with each other via a CPU bus 16.

The semiconductor integrated circuit shown in FIG. 1 further includes a DMA controller 21 for controlling direct memory access operation, a WDT (watch dog timer) 22, and a restore flag 15.

The WDT 22, monitoring a counter reset signal CR outputted on a regular basis from the CPU 11, outputs a time-over signal TO, if the counter reset signal CR has not been inputted within a predetermined period of time because of a program runaway.

The DMA controller 21 functions as a data-transfer control means that exercises control so that the data D1, D2 and D3 are saved in the backup memory 14 each time the CPU 11, being under normal operation, supplies the counter reset signal CR to the WDT 22, and so that the data that has been saved in the backup memory 14 is restored to the CPU 11, the RAM 12 and the peripheral circuit 13, respectively, if the WDT 22 has detected a program runaway and outputted the time-over signal TO.

In FIG. 1, the reference mark C1 denotes read/write signals for the CPU 11, C2 denotes read/write signals for the RAM 12, C3 denotes read/write signals for the peripheral circuit 13, and C4 denotes read/write signals for the backup memory 14. For example, to save the data D1 of the CPU 11 in the backup memory 14, read and write operations are specified by the signals C1 and C4, respectively. To restore the data that has been saved in the backup memory 14 to the CPU 11, read and write operations are specified by the signals C4 and C1, respectively.

The restore flag 15 informs the CPU 11 that a data-restoring operation has been performed under control of the DMA controller 21. The reference mark C5 denotes a write signal for the restore flag 15, and the signal C5 sets the restore flag 15. The restore flag 15 is reset when the CPU 11 performs a read operation.

In the semiconductor integrated circuit shown in FIG. 1 having the above-described structure, the data D1, D2 and D3, which is the minimum data required for the semiconductor integrated circuit, is saved in the backup memory 14 when the CPU 11 operates properly, and if the WDT 22 has detected a program runway, the respective data that has been saved in the backup memory 14 is restored; therefore even in a case where a program has run away because of an external noise, for example, it is possible to resume the normal operation from midway in the program. Specifically, the normal state is not recovered by a reset operation, but the internal state of the semiconductor integrated circuit is permitted to be restored to the point when the normal operation was last being performed.

In addition, the saving/restoring of only the minimum required, critical data reduces the time required for the saving/restoring as well as allowing the capacity of the backup memory 14 to decrease.

Moreover, the presence of the restore flag 15, which informs the CPU 11 that a data-restoring operation has been performed, allows the CPU 11 to check the restore flag 15 after the restart of the operation, to recognize that a program runaway has occurred. This therefore provides an opportunity to implement a recovery program prepared for this case to recapture data from an external device or to perform recalculations, thereby correcting the internal state.

It should be understood that all the data stored in the CPU 11, RAM 12 and peripheral circuit 13 may be saved and restored. In that case, the normal internal state of the semiconductor integrated circuit is restored completely, thereby eliminating the need for the restore flag 15.

The DMA controller 21 may supply one of the signals C1 to the CPU 11 as a CPU-stop signal to stop operation of the CPU 11 when data is being saved in the backup memory 14 and restored from the backup memory 14. This avoids an error writing due to a program runaway during the data saving/restoring, which therefore heightens the reliability of the data.

Further, the backup memory 14 may be a non-volatile memory. This is preferable because, in that case, the data in the backup memory 14 is retained even when the power supply has been shut off, which allows the operation to be restarted from midway in the program after the power supply is recovered. Power may be supplied to the backup memory 14 only when data is saved and restored. The backup memory 14 may be an external memory to the semiconductor integrated circuit.

Figure 2:
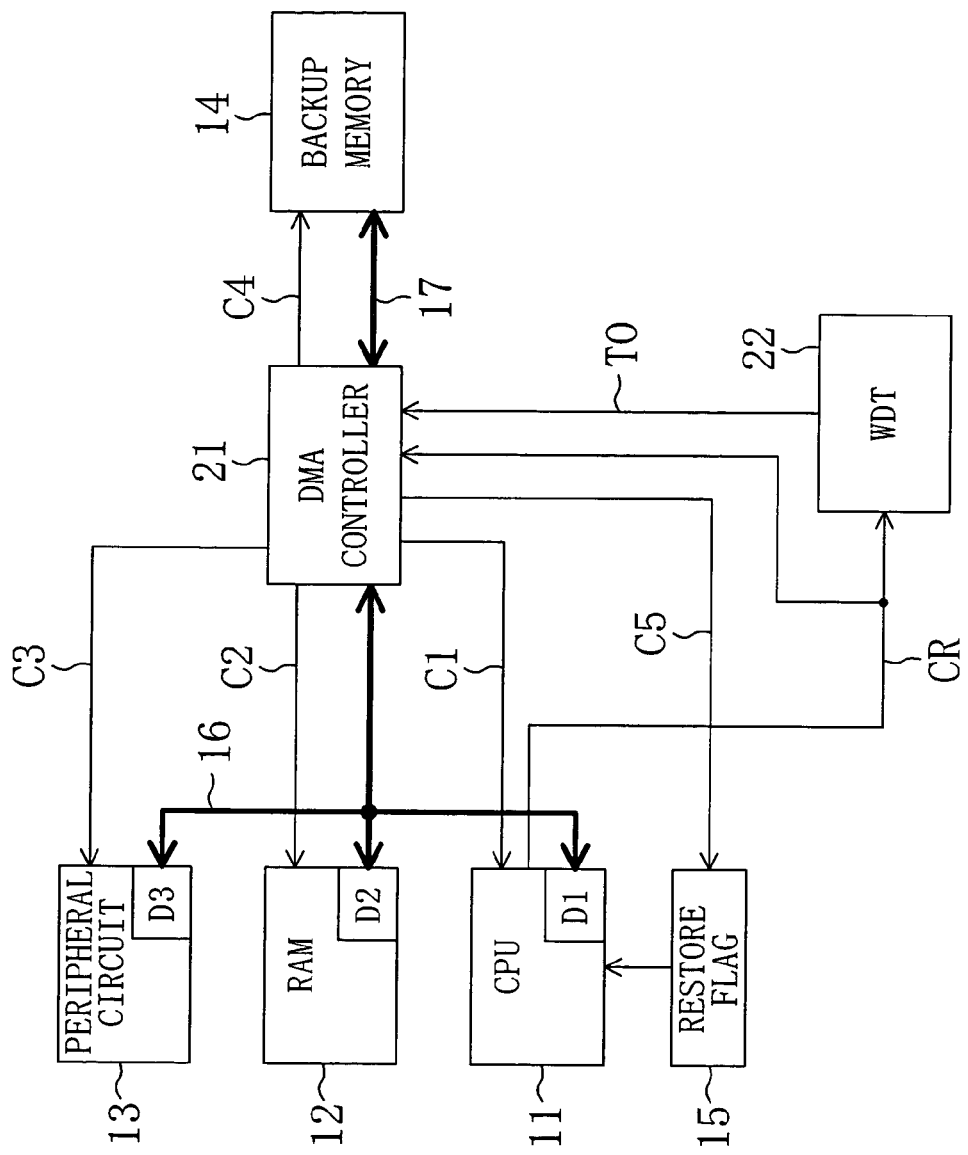
FIG. 2 is a block diagram illustrating another exemplary configuration of the semiconductor integrated circuit in accordance with the present invention.

FIG. 2 illustrates another exemplary configuration of the semiconductor integrated circuit in accordance with the present invention. As shown in FIG. 2, the backup memory 14 is connected to the DMA controller 21 via a bus 17, which is separate from the CPU bus 16 and used exclusively for the backup memory 14, such that the CPU 11 does not have access to the backup memory 14. This prevents the CPU 11 from erroneously rewriting data saved in the backup memory 14 when a program of the CPU 11 has run away. In the other respects, the configuration shown in FIG. 2 is the same as the structure shown in FIG. 1.

Figure 3:
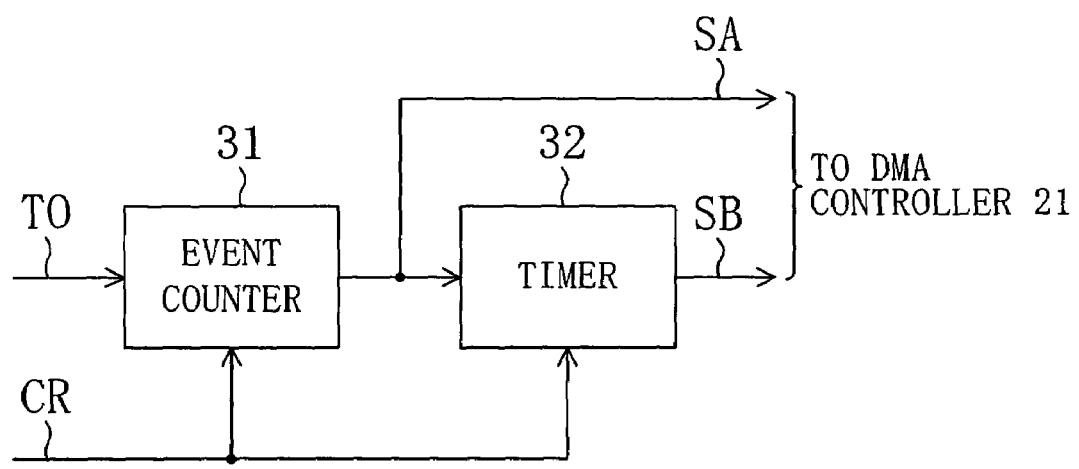
FIG. 3 is a block diagram illustrating an exemplary configuration of a restore controller in accordance with a modified example of the configurations shown in FIGS. 1 and 2.

FIG. 3 illustrates an exemplary configuration of a restore controller in accordance with a modified example of the configurations shown in FIGS. 1 and 2. The restore controller shown in FIG. 3 includes an event counter 31 and a timer 32. The event counter 31 counts the number of time-over signals TO, thereby counting the number of program runaways that the WDT 22 has detected. When the count value of the event counter 31 reaches a predetermined value to cause an overflow, a CPU-stop request signal SA is provided to the DMA controller 21 and the timer 32. In a given period of time after the receipt of the CPU-stop request signal SA, the timer 32 supplies a CPU-stop cancel request signal SB to the DMA controller 21. Where the CPU-stop request signal SA has been supplied to the DMA controller 21, the DMA controller 21 asserts the CPU-stop signal C1 after the restoring operation has been completed, while the DMA controller 21 negates the CPU-stop signal C1 to resume operation of the CPU 11, if the CPU-stop cancel request signal SB has been supplied. Therefore, if a program runway continues even after a data-restoring operation has been performed several times, operation of the CPU 11 is forced to stop only for a certain period of time and then resumed after the cause of the runway has disappeared. The event counter 31 and the timer 32 are each cleared by the counter reset signal CR indicating the normal operation of the CPU 11.

In the foregoing examples, the counter reset signal CR supplied to the WDT 22 is employed as a timing signal for data saving, however, data may be saved at various other timings such as when an important register, e.g., a status register, is rewritten, when an interruption has occurred, when a specific instruction is performed, when a noise has been detected, and when numerous errors have been detected in serial communications. Examples of the interruption include a timer interruption, an interruption which occurs during an analog-to-digital conversion, and an external interruption coming from another microcomputer.

What is claimed is:

1. A semiconductor integrated circuit comprising:
    a control block of a stored-program type;
    a backup memory in which saved data is stored;
    runaway detection means for detecting a program runaway in the control block; and
    data transfer control means for exercising control so that data of the control block is saved in the backup memory when the control block operates normally, and so that the data that has been saved in the backup memory is restored to the control block, if the program runaway has been detected,
    wherein normal operation is allowed to be resumed from midway in the program even in the case of the program runaway.

2. The semiconductor integrated circuit of claim 1, further comprises:
    another circuit block including a data storage portion,
    wherein the data transfer control means further functions to exercise control so that data of said another circuit block is saved in the backup memory when the control block operates normally, and so that the data that has been saved in the backup memory is restored to said another circuit block, if the program runaway has been detected.

3. The semiconductor integrated circuit of claim 1 or 2, wherein the data transfer control means controls saving and restoring of only critical data among all the data held in the control block and said another circuit block.

4. The semiconductor integrated circuit of claim 1 or 2, wherein the data transfer control means further functions to stop operation of the control block when the data is being saved in the backup memory and restored from the backup memory.

5. The semiconductor integrated circuit of claim 1 or 2, wherein the data transfer control means is a DMA controller for controlling direct memory access operation.

6. The semiconductor integrated circuit of claim 1 or 2, wherein the runaway detection means is a watch dog timer.

7. The semiconductor integrated circuit of claim 1 or 2, wherein the backup memory is a non-volatile memory.

8. The semiconductor integrated circuit of claim 1 or 2, wherein the backup memory is an external memory to the semiconductor integrated circuit.

9. The semiconductor integrated circuit of claim 1 or 2, further comprises a restore flag for informing the control block that the data-restoring operation has been performed under the control exercised by the data transfer control means.

10. The semiconductor integrated circuit of claim 1 or 2, wherein the backup memory is connected to the data transfer control means via a dedicated bus which is different from a bus for the control block, so that the control block does not have access to the backup memory.

11. The semiconductor integrated circuit of claim 1 or 2, further comprises:
   an event counter for counting the number of times that the program runaway has been detected, and
   a timer for, when the count value of the event counter has reached a predetermined value, halting operation of the control block for a given period of time and then resuming the operation.

* * * * *